US012753899B1

(12) United States Patent
Ellington et al.

(10) Patent No.: US 12,753,899 B1
(45) Date of Patent: Oct. 6, 2026

(54) VEHICLE LAMP ASSEMBLY

(71) Applicant: Honda Motor Co., Ltd., Tokyo (JP)

(72) Inventors: Andrew Evan Ellington, Marysville, OH (US); Marco Antonio Arteaga Quezada, Dublin, OH (US); Logan M. Kingen, West Liberty, OH (US); Takahiro Sato, Saitama (JP); Joshua Morrow, Dublin, OH (US); Ryan Egli Profera, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/948,864

(22) Filed: Nov. 15, 2024

(51) Int. Cl.

| | |
|---|---|
| ***F21S 43/20*** | (2018.01) |
| ***F21S 43/14*** | (2018.01) |
| ***F21S 43/19*** | (2018.01) |
| ***F21S 43/31*** | (2018.01) |
| ***F21W 103/10*** | (2018.01) |
| ***F21Y 115/10*** | (2016.01) |

(52) U.S. Cl.

CPC ......... *F21S 43/26211* (2024.05); *F21S 43/14* (2018.01); *F21S 43/195* (2018.01); *F21S 43/26411* (2024.05); *F21S 43/31* (2018.01); *F21W 2103/10* (2018.01); *F21Y 2115/10* (2016.08)

(58) Field of Classification Search

CPC ...... F21S 43/26211; F21S 43/14; F21S 43/31; F21S 43/195; F21S 43/26411; F21S 43/239; F21S 43/45; F21S 43/249

See application file for complete search history.

(56) References Cited

U.S. PATENT DOCUMENTS 6,102,559 A * 8/2000 Nold .................... B60Q 1/2607 362/558
6,896,397 B2 * 5/2005 Yamada ............... B60Q 1/0058 362/613
8,384,848 B2 * 2/2013 Wang .................. G02B 6/0031 362/97.3
8,752,986 B2 6/2014 Wuerthele et al.
9,599,308 B2 * 3/2017 Ender ................... F21S 43/239
9,677,735 B2 6/2017 Hardy et al.
10,738,963 B2 * 8/2020 Totsuka .................. F21S 45/10
(Continued)

FOREIGN PATENT DOCUMENTS

CN 203927658 U 11/2014
CN 207599604 U 7/2018
(Continued)

*Primary Examiner* — Matthew J. Peerce
(74) *Attorney, Agent, or Firm* — Rankin, Hill & Clark LLP

(57) ABSTRACT

A vehicle lamp assembly includes a lamp housing defining a lamp housing opening, a first lens arranged on the lamp housing and in the lamp housing opening, and a second lens disposed in the lamp housing behind the first lens. The vehicle lamp assembly further includes a first light source and a second light source. The first light source is disposed in the lamp housing and arranged within the lamp housing so that a first light source light from the first light source is directed toward and through each of the first and second lenses. The second light source is disposed in the lamp housing and arranged within the lamp housing such that a second light source light from the second light source is directed only into the second lens and the second lens redirects the second light toward and through the first lens.

17 Claims, 3 Drawing Sheets

(56) References Cited

U.S. PATENT DOCUMENTS

| | | | | |
|---|---|---|---|---|
| 11,946,612 | B2 * | 4/2024 | Hallitschke | B60Q 1/544 |
| 2001/0048601 | A1 * | 12/2001 | Emmelmann | F21S 43/249<br>362/543 |
| 2009/0213587 | A1 * | 8/2009 | Enomoto | H05K 3/326<br>362/249.02 |
| 2016/0290588 | A1 * | 10/2016 | Kim | F21S 43/247 |
| 2021/0062993 | A1 * | 3/2021 | Buisson | F21S 43/237 |

FOREIGN PATENT DOCUMENTS

| | | | |
|---|---|---|---|
| CN | 213395135 | U | 6/2021 |
| CN | 214198511 | U | 9/2021 |
| CN | 113375121 | B | 7/2022 |
| JP | 6381081 | B2 | 8/2018 |
| WO | WO2017036787 | A1 | 3/2017 |

* cited by examiner

VEHICLE LAMP ASSEMBLY

BACKGROUND

It is well known to use light emitting diodes (LED) for lighting in modern vehicles. Such usage includes being deployed in the tail lights of vehicles. In one known tail light lamp assembly, a plurality of LED lights is disposed on a printed circuit board (PCB) and light emitted from the LEDs is directed through one or more lenses to provide tail light lighting for the vehicle. In recent years, the structure and/or shape of vehicle tail lights have been diversified in order to realize novel vehicle designs. For example, varying tail light shapes are used to provide a unique design for the vehicle. One drawback of using such varying designs is that it can be difficult to achieve uniform lighting for the tail light from an aesthetic or appearance perspective.

BRIEF DESCRIPTION

According to one aspect, a vehicle lamp assembly includes a lamp housing defining a lamp housing opening, a first lens arranged on the lamp housing and in the lamp housing opening, and a second lens disposed in the lamp housing behind the first lens. The vehicle lamp assembly further includes a first light source and a second light source. The first light source is disposed in the lamp housing and arranged withing the lamp housing so that a first light source light from the first light source is directed toward and through each of the first and second lenses. The second light source is disposed in the lamp housing and arranged within the lamp housing such that a second light source light from the second light source is directed only into the second lens and the second lens redirects the second light toward and through the first lens.

According to another aspect, a tail light lamp assembly having a lamp housing includes an outer lens and an inner lens. The outer lens is disposed on the lamp housing, and the inner lens is disposed in the lamp housing behind the outer lens. The tail light lamp assembly further includes a first light source and a second light source. The first light source is disposed in the housing and oriented so that a first light source light from the first light source is aimed in a first direction. The first direction is toward the inner lens and toward the outer lens. The second light source is disposed in the housing and oriented so that a second light source light from the second light source is aimed in a second direction. The second direction is toward the inner lens.

According to a further aspect, a lamp assembly for a vehicle includes a plurality of first light emitting diodes arranged to direct light directly toward an inner lens and directly toward an outer lens, and a plurality of second light emitting diodes arranged to direct light directly toward the inner lens and indirectly toward the outer lens. The first and second lenses are arranged in a lamp housing in stacked and spaced apart relation relative to one another. The plurality of second light emitting diodes direct light into an edge portion of the inner lens.

DETAILED DESCRIPTION

It should, of course, be understood that the description and drawings herein are merely illustrative and that various modifications and changes may be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately" means a reasonable amount of deviation of the modified word is contemplated such that the end result is not significantly changed.

Figure 1:
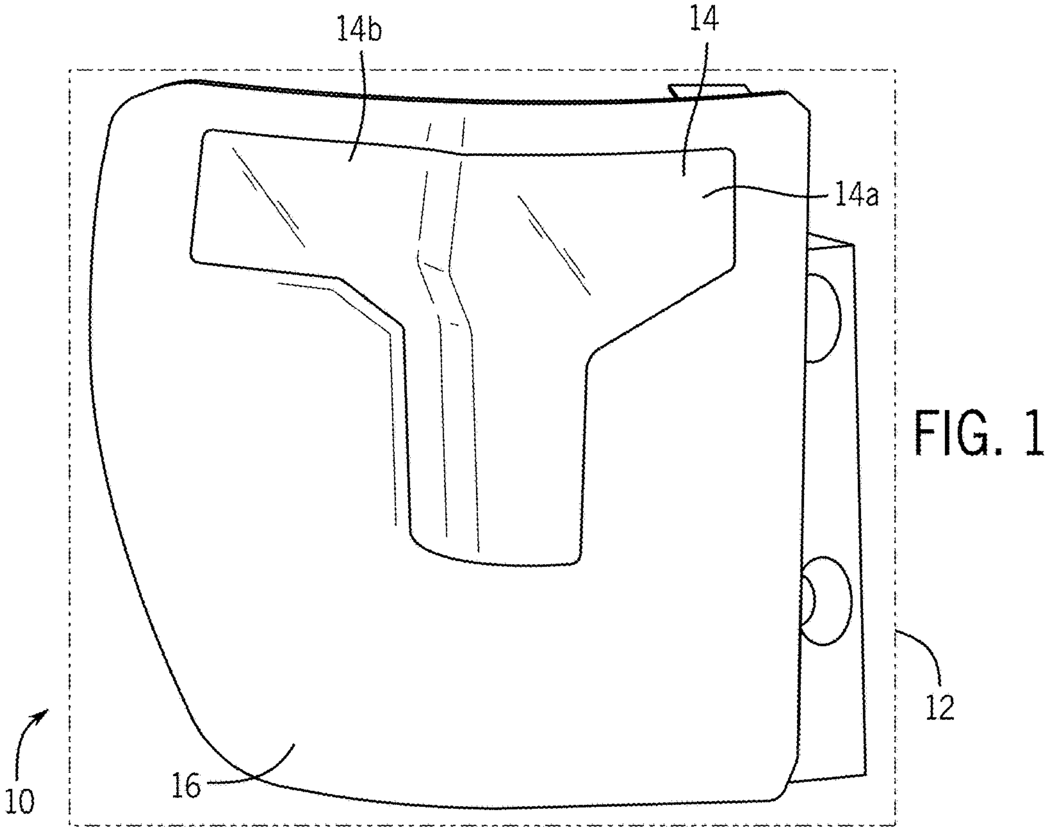
FIG. 1 is a schematic view of an exemplary lamp assembly tail light for a vehicle according to one aspect of the present disclosure.
Figure 2:
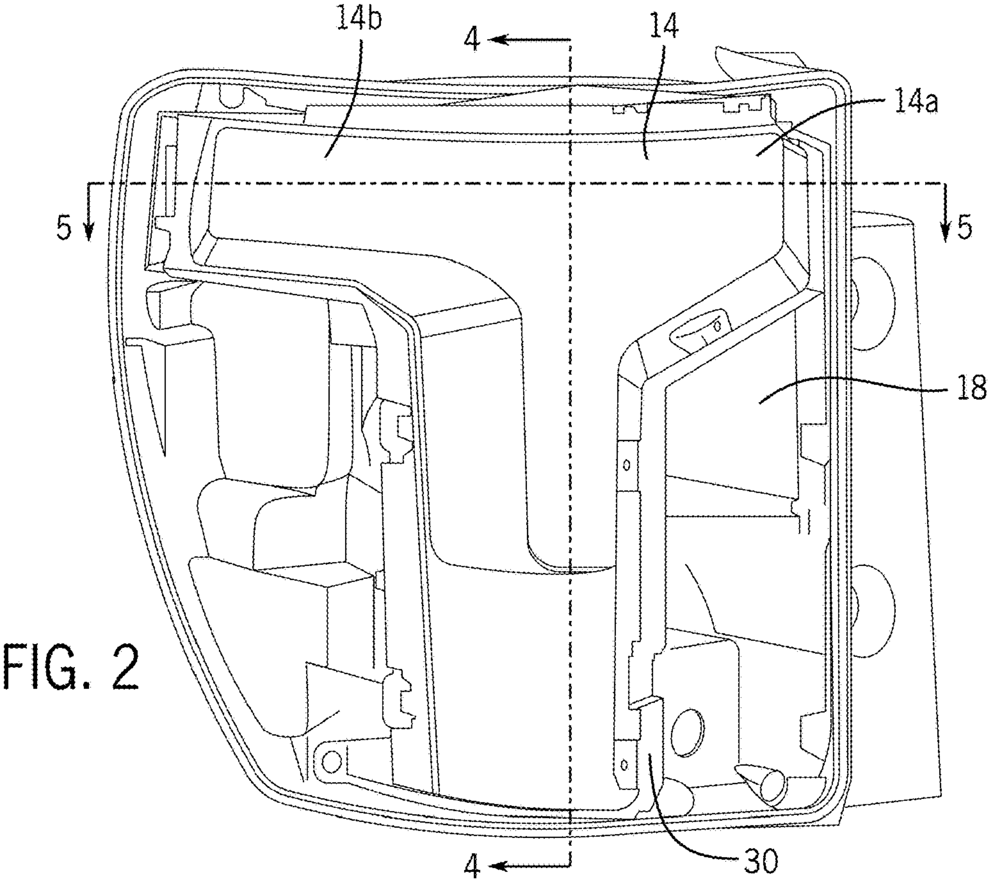
FIG. 2 is another schematic view of the lamp assembly of FIG. 1 but shown with an outer housing member removed.

Referring now to the drawings, wherein like numerals refer to like parts throughout the illustrated, FIGS. 1 and 2 schematically illustrate an exemplary vehicle lamp assembly 10 for a vehicle 12 is shown according to one embodiment of the present disclosure. In the illustrated embodiment, the vehicle lamp assembly 10 is a tail light lamp assembly disposed on the vehicle 12, though it is to be appreciated that other embodiments are contemplated wherein the lamp assembly 10 is used elsewhere on the vehicle 12.

As shown in FIG. 1, the lamp assembly 10 includes a first or outer lens 14 that is exposed and viewable from an exterior of the vehicle 12. An outer housing member 16 surrounds the outer lens 14. With additional reference to FIG. 2, the outer housing member 16 is shown removed to expose an inner housing member or lamp housing 18. The outer lens 14 is arranged on the lamp housing 18 and secured thereto.

Figure 3:
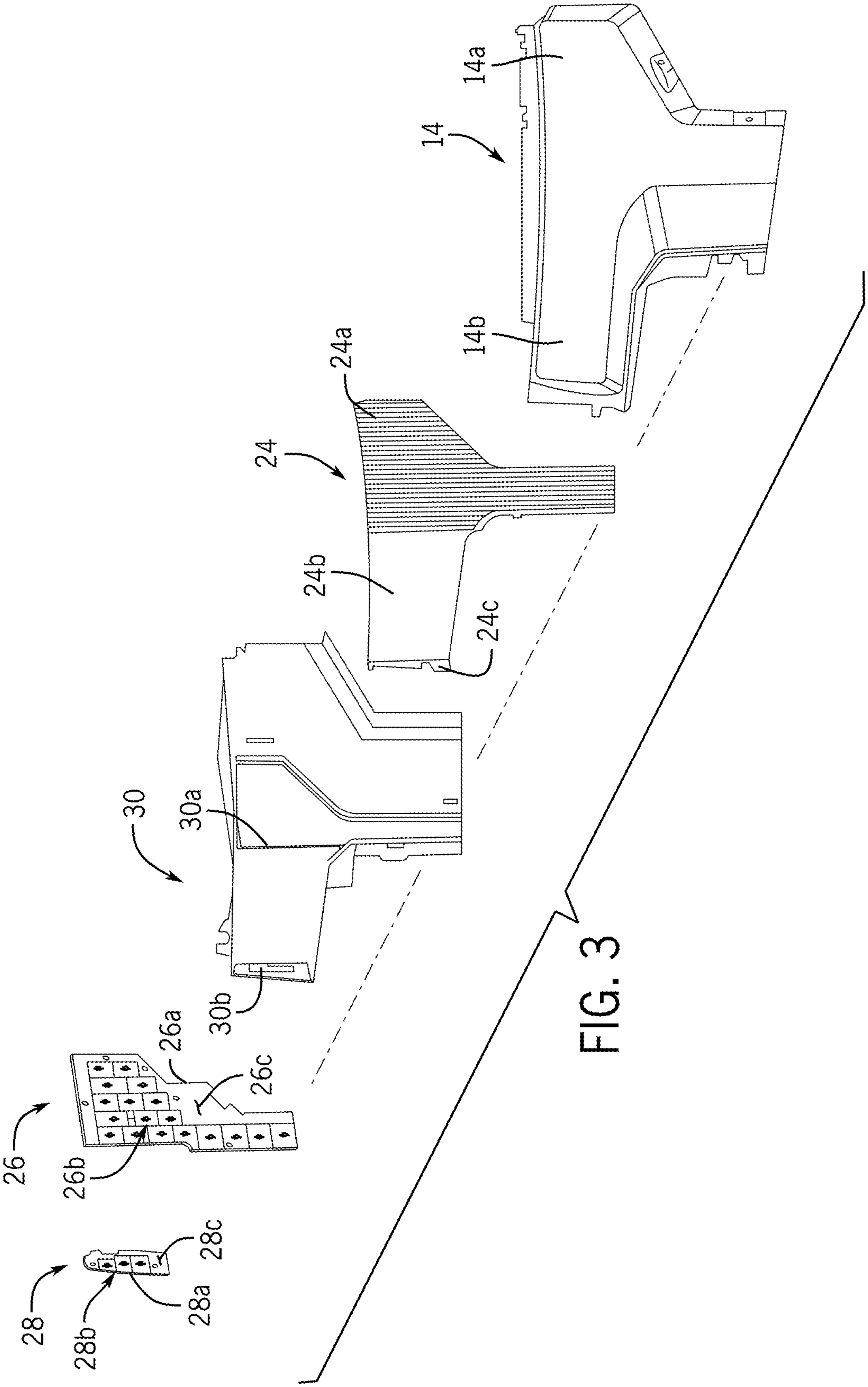
FIG. 3 is an exploded perspective view of the lamp assembly of FIGS. 1 and 2 shown with the outer housing member and an inner housing member both removed.
Figure 5:
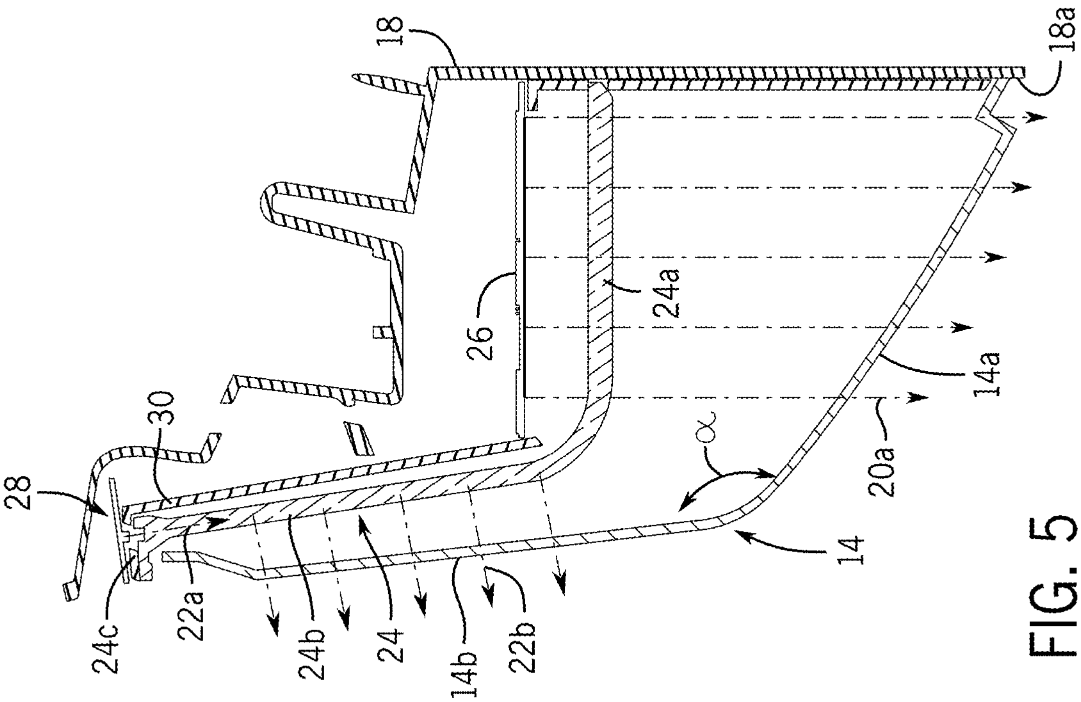
FIG. 5 is a cross section view of the lamp assembly taken along the line 5-5 of FIG. 2.
Figure 4:
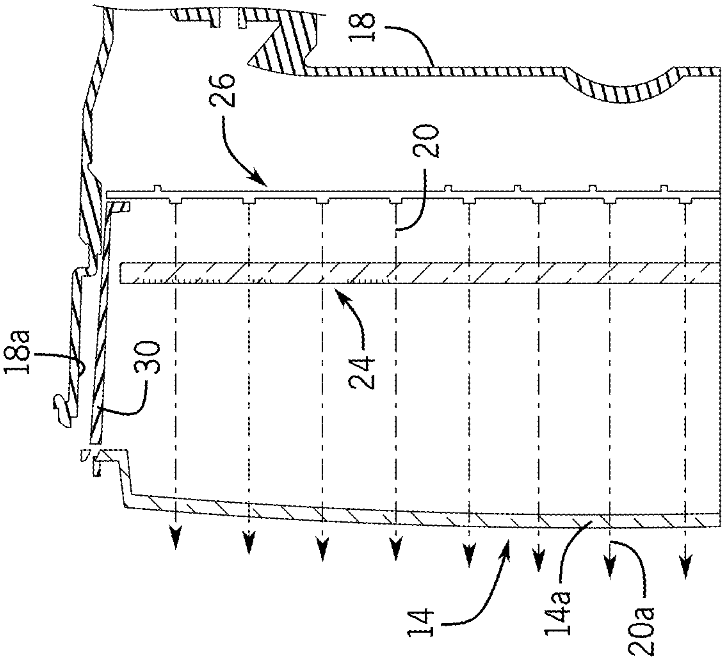
FIG. 4 is a cross section view of the lamp assembly taken along the line 4-4 of FIG. 2.

With further reference to FIGS. 3-5, details of the exemplary lamp assembly 10 will be described. As shown in FIG. 3, the lamp assembly 10 further includes a second or inner lens 24, a first light source 26, a second light source 28, and a reflector or reflector member 30. The light sources 26, 28 function to provide light or illumination for the lamp assembly 10. The reflector 30 directs light from one or both of the light sources 26, 28 to the lenses 14, 24 and the lenses 14, 24 function to shape, focus and/or direct light from the light sources 26, 28.

In the illustrated embodiment, the outer lens 14 has a first or main face **14*a* and a second or adjacent face 14*b*, which is adjacent to and may be smaller than the main face 14*a*. The inner lens 24, which is arranged behind the outer lens 14, has a first or main section 24*a* and a second or adjacent section 24*b*, which is adjacent to and may be smaller than the main section 24*a*. The inner lens 24 also has a side or edge portion 24*c*, which may be located on a side of the adjacent section 24*b* and remote from the main section 24*a*. In some embodiments, the main section 24*a* of the inner lens 24 may be arranged behind the main face 14*a* of the outer lens 14, and the adjacent section 24*b* of the inner lens 24 may be arranged behind the adjacent face 14*b* of the outer lens 14**.

Further, in the illustrated embodiment, the first light source 26 includes a first printed circuit board **26*a* having a plurality of first light emitting diodes 26*b* disposed thereon for emitting light. The plurality of first light emitting diodes 26*b* are arranged to direct light, directly toward the inner lens 24 and directly toward the outer lens 14. The second light source 28 includes a second printed circuit board 28***a* having a plurality of second light emitting diodes 28*b* disposed thereon for emitting light. The plurality of second light emitting diodes 28*b* are arranged to direct light, directly toward the inner lens 24 and indirectly toward the outer lens 14.

The first printed circuit board 26*a* has a first mounting surface 26*c* on which the plurality of first light emitting diodes 26*b* are disposed such that light from the plurality of first light emitting diodes 26*b* is directed substantially orthogonal relative to the first mounting surface 26*c*. The first mounting surface 26*c* is arranged to face the outer lens 14 as best shown in FIG. 4 and is substantially parallel to the main section 24*a* of the inner lens 24.

The second printed circuit board 28*a* has a second mounting surface 28*c* on which the plurality of second light emitting diodes 28*b* are disposed such that light emitted from the plurality of second light emitting diodes 28*b* is directed substantially orthogonal relative to the second mounting surface 28*c*. The second mounting surface 28*c* is arranged substantially perpendicular to the adjacent section 24*b* of the inner lens 24, and substantially perpendicular to the adjacent face 14*b* of outer lens 14.

The reflector 30 is arranged behind the outer lens 14 and inner lens 24. The reflector 30 includes a first aperture 30*a* may be referred to as a first printed circuit board aperture 30*a*, in which the first printed circuit board 26*a* is at least partially disposed. In one embodiment, a shape of the first printed circuit board 26*a* substantially matches a shape of the printed circuit board aperture 30*a* (i.e., a perimeter shape of the first printed circuit board 26*a* substantially complementarily matches a shape of the printed circuit board aperture 30*a*). The reflector 30 may also include a second aperture 30*b*, which may be referred to as a second printed circuit board aperture 30*b*, in which the second printed circuit board 28*a* is at least partially disposed.

With additional reference to FIGS. 4 and 5, the lamp housing 18 defines a lamp housing opening 18*a* and has the outer lens 14 arranged or disposed in the lamp housing opening 18*a*. As shown, the inner lens 24 is disposed in the lamp housing 18 behind the outer lens 14. In particular, as shown, the first and second lenses 14, 24 are arranged in the lamp housing 18 in stacked and spaced apart relation relative to one another. As will be described in more detail below, the first light source 26 is disposed in the lamp housing 18 and arranged within the lamp housing 18 so that first light source light 20 originating from the first light source 26 is directed toward and through each of the outer and inner lenses 14, 24 as indicated by arrows 20*a*.

Also, as will be described in more detail below, the second light source 28 is disposed in the lamp housing 18 and arranged within the lamp housing 18 such that second light source light 22 originating from the second light source 28 is directed only into the inner lens 24 as indicated by arrow 22*a*, and then the inner lens 24 redirects the second light source light 22 toward and through the outer lens 14 as indicated by arrows 22*b*. More particularly, the second light source light 22 includes a direct portion 22*a* that is immediately directed into the inner lens 24 and redirected by the inner lens 24 into a redirected portion 22*b* that is directed by the inner lens 24 toward the outer lens 14. By this arrangement, the outer lens 14 is disposed on the lamp housing 18 so that substantially all light exiting the lamp housing 18 passes through the outer lens 14.

In the illustrated embodiment, the first light source 26 is disposed in the housing 18 and oriented such that the first light source light 20 from the first light source 26 is aimed in a first direction (i.e., the direction indicated by arrow 20*a*). As illustrated, the first direction is toward the inner lens 24 and toward the outer lens 14, and particularly toward the main section 24*a* of the inner lens 24 and toward the main face 14*a* of the outer lens 14.

The second light source 28 is disposed in the housing 18 and oriented so that the second light source light 22 is aimed in a second direction (i.e., the direction indicated by arrow 22*a*). As shown, the second direction is toward the inner lens 24, and particularly toward the adjacent section 24*b* of inner lens 24. More specifically, and with particular reference to FIG. 5, the second light source 28 is arranged within the lamp housing 18 and relative to the inner and outer lenses 14, 24 so that the second light source light 22 from the second light source 28 is directed into the adjacent section 24*b* of inner lens 24, and particularly into the edge portion 24*c* of the adjacent section 24*b* of the inner lens 24. By this arrangement, the second light source 28 is arranged within the lamp housing 18 and relative to the inner and outer lenses 14, 24 so that the second light source light 22 from the second light source 28 is directed in a direction (i.e., the direction indicated by arrow 22*a*) approximately parallel relative to the adjacent section 24*b* of the inner lens 24.

As best shown in FIG. 5, the adjacent section 24*b* of inner lens 24 is oriented relative to the main section 24*a* in approximately perpendicular relation. Also, the adjacent section 24*b* of inner lens 24 is oriented relative to the adjacent face 14*b* of the outer lens 14 in approximately parallel relation. In some embodiments, the adjacent face 14*b* of outer lens 14 is oriented relative to the main face 14*a* at an obtuse angle $\alpha$, such as between 120 and 160 degrees, preferably 130 and 150 degrees.

The first light source 26 may be a primary light source and the second light source 28 may be a secondary light source. In particular, for example, the plurality of second light emitting diodes 28*b* of the secondary light source 28 may include less than 50% of the light emitting diodes of the plurality of first light emitting diodes 26*b* of the first light source 26. In a more specific example, the plurality of second light emitting diodes 28*b* may include less than 20% of the light emitting diodes of the plurality of first light emitting diodes 26*b*. In the illustrated embodiment, the plurality of first light emitting diodes 26*b* includes eighteen (18) light emitting diodes, and the plurality of second light emitting diodes 28*b* includes three (3) light emitting diodes. It is of course to be understood and appreciated by those skilled in the art that the precise number and ratio of light emitting diodes from the first and second light sources 26, 28 may vary from what is shown and described, but generally the first light source 26 will include more light emitting diodes than the second light source 28, such as having twice the number, preferably at least five times the number of light emitting diodes.

The first direction of the first light source 26, and particularly the light 20 therefrom, may be orthogonal relative to main section 24*a* of the inner lens 24 disposed directly in front of the first light source 26, and the second direction of the second light source 28, and particularly the light portion 22*a*, may be parallel to the adjacent section 24*b* of the inner lens 24 disposed immediately and directly in front of the second light source 28. Also, the second direction for the light portion 22*a* of the second light source 28 may be toward the inner lens 24, and particularly toward the edge portion 24*c* of the inner lens 24. As shown in FIGS. 4 and 5, the light 20 from the first light source 26 is directly fired toward both the first and second lenses 14, 24. In contrast, the light 22 from the second light source 28 is directly fired only toward the inner lens 24 (and not directly toward the outer lens 14) but is redirected by the inner lens 24 and thereby indirectly fired into the outer lens 14. Advantageously, by this arrangement, the lamp assembly described herein may provide a uniform lit appearance for the lamp assembly 10 despite the unique shape for the lamp assembly 10. In the illustrated embodiment, the unique shape is a "T" shape; however, the lamp assembly 10 may have other various shapes and arrangements.

It will be appreciated that various of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A vehicle lamp assembly, comprising:

a lamp housing defining a lamp housing opening;

a first lens arranged on the lamp housing and in the lamp housing opening, the first lens being substantially L-shaped and defined by a first side and a second side;

a second lens disposed in the lamp housing behind the first lens, the second lens including a main section and an adjacent section extended outwardly from the main section, the adjacent section arranged behind the second side of the first lens;

a first light source comprising a first printed circuit board having a plurality of first light emitting diodes disposed thereon, the first light source disposed in the lamp housing and arranged within the lamp housing so that a first light source light from the first light source is directed toward and through each of the first and second lenses; and a second light source comprising a second printed circuit board having a plurality of second light emitting diodes disposed thereon, the second light source disposed in the lamp housing and arranged within the lamp housing such that substantially all second light source light emitted from the second light source is directed into the second lens and is not directed directly toward the first lens, and the second lens being configured to redirect the second light source light toward and through the first lens, wherein the second light source is arranged within the lamp housing and relative to the second and first lenses so that the second light source light from the second light source is directed into an edge portion of the adjacent section of the second lens in a direction approximately parallel relative to the adjacent section, wherein the plurality of second light emitting diodes includes less than 50% of the light emitting diodes of the plurality of first light emitting diodes.

2. The vehicle lamp assembly of claim 1 wherein the first printed circuit board has a first mounting surface on which the plurality of first light emitting diodes are disposed such that first light source light from the plurality of first light emitting diodes is directed substantially orthogonal relative the first mounting surface, the first mounting surface arranged to face the first lens.

3. The vehicle lamp assembly of claim 2 wherein the second printed circuit board has a second mounting surface on which the plurality of second light emitting diodes are disposed such that the second light source light emitted from the plurality of second light emitting diodes is directed substantially orthogonal relative the second mounting surface, the second mounting surface oriented substantially perpendicular relative to the adjacent section of the second lens.

4. The vehicle lamp assembly of claim 1 further including a reflector disposed in the lamp housing, the reflector defining a printed circuit board aperture in which the first printed circuit board is disposed.

5. The vehicle lamp assembly of claim 4 wherein a shape of the first light printed circuit board substantially matches a shape of the printed circuit board aperture.

6. The vehicle lamp assembly of claim 1 wherein the plurality of second light emitting diodes includes less than 20% of the light emitting diodes of the plurality of first light emitting diodes.

7. The vehicle lamp assembly of claim 1 further including a reflector disposed in the lamp housing, the reflector defining a first light source aperture in which the first light source is disposed.

8. A tail light lamp assembly having a lamp housing, comprising:

an outer lens disposed on the lamp housing, the outer lens being substantially L-shaped and defined by a first side and a second side;

an inner lens disposed in the lamp housing behind the outer lens, the inner lens including a first section and a second section extended outwardly from the first section, the second section of the inner lens arranged behind the second side of the outer lens;

a first light source comprising a first printed circuit board having a plurality of first light emitting diodes disposed thereon, the first light source disposed in the housing and oriented so that a first light source light from the first light source is aimed in a first direction, wherein the first direction is orthogonal relative to a first section of the inner lens disposed in front of the first light source and is toward the inner lens and toward the outer lens; and a second light source comprising a second printed circuit board having a plurality of second light emitting diodes disposed thereon, the second light source disposed in the housing and oriented so that a second light source light from the second light source is aimed in a second direction, wherein the second direction is parallel to the second section of the inner lens disposed immediately and directly in front of the second light source, and wherein the second direction is toward the inner lens, wherein the inner lens is configured to internally redirect the second light source light toward and through the outer lens such that light from the second light source exits the lamp housing only after passing through the inner lens and then through the outer lens.

9. The tail light lamp assembly of claim 8 further including a reflector disposed in the lamp housing, the reflector defining a first light source aperture in which the first printed circuit board is disposed.

10. The tail light lamp assembly of claim 9 wherein a perimeter shape of the first printed circuit board substantially complementarily matches a shape of the reflector defining the first light source aperture.

11. The tail light lamp assembly of claim 8 wherein the second direction toward the inner lens is toward an edge portion of the second section of the inner lens.

12. A lamp assembly for a vehicle, comprising:

a lamp housing;

an inner lens and an outer lens arranged in the lamp housing in stacked and spaced apart relation relative to one another, the outer lens being substantially L-shaped and defined by a first side and a second side, the inner lens including a main section and an adjacent section extended outwardly from the main section, the adjacent section of the inner lens arranged behind the second side of the outer lens;

a first printed circuit board having a first mounting surface, the first mounting surface arranged to face the outer lens;

a second printed circuit board having a second mounting surface oriented substantially perpendicular relative to an adjacent section of the inner lens;

a plurality of first light emitting diodes disposed on the first mounting surface of the first printed circuit board, the plurality of first light emitting diodes disposed in the lamp housing and arranged to direct light substantially orthogonal relative to the first mounting surface, directly toward the inner lens and directly toward the outer lens; and a plurality of second light emitting diodes disposed on the second mounting surface of the second printed circuit board, the plurality of second light emitting diodes disposed in the lamp housing and arranged to direct light substantially orthogonal relative the second mounting surface, directly toward the inner lens and indirectly toward the outer lens, wherein the plurality of second light emitting diodes directs light into an edge portion of the adjacent section of the inner lens.

13. The tail light lamp assembly of claim 8, wherein the plurality of second light emitting diodes includes less than 50% of the light emitting diodes of the plurality of first light emitting diodes.

14. The lamp assembly of claim 12, wherein the plurality of second light emitting diodes includes less than 50% of the light emitting diodes of the plurality of first light emitting diodes.

15. The lamp assembly of claim 14, wherein the plurality of second light emitting diodes includes less than 20% of the light emitting diodes of the plurality of first light emitting diodes.

16. The lamp assembly of claim 14, wherein the inner lens is configured to redirect light from the plurality of second light emitting diodes toward and through the outer lens.

17. The lamp assembly of claim 14, further including a reflector disposed in the lamp housing, the reflector defining a printed circuit board aperture in which the first printed circuit board is disposed.

* * * * *